United States Patent Office 2,874,907
Patented Feb. 24, 1959

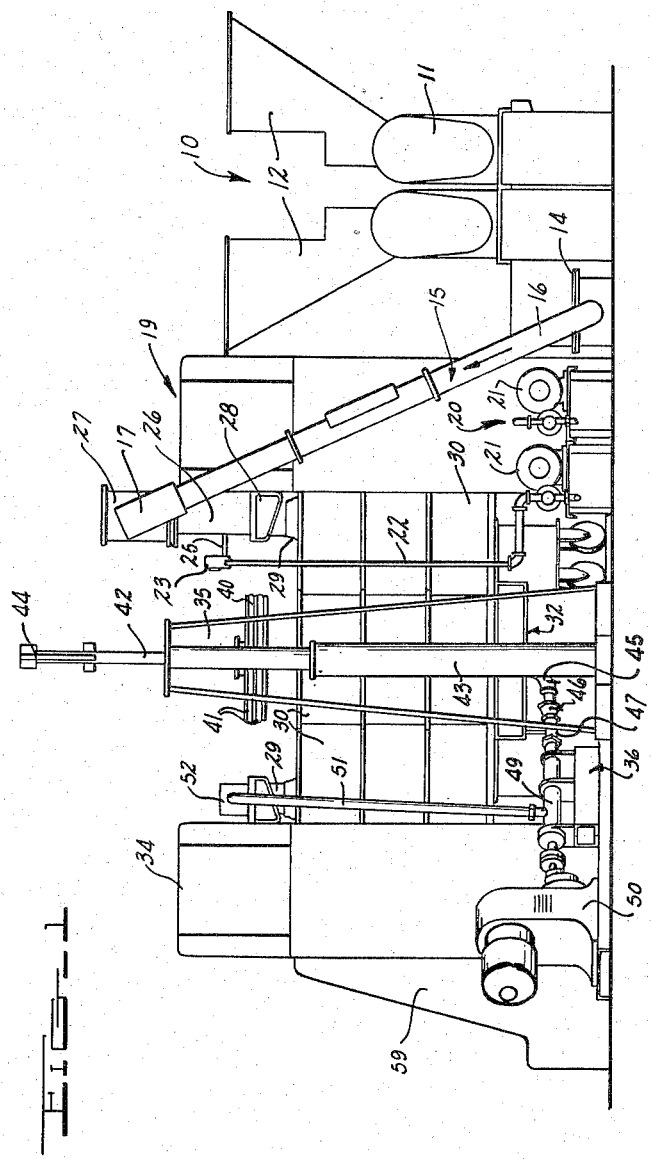

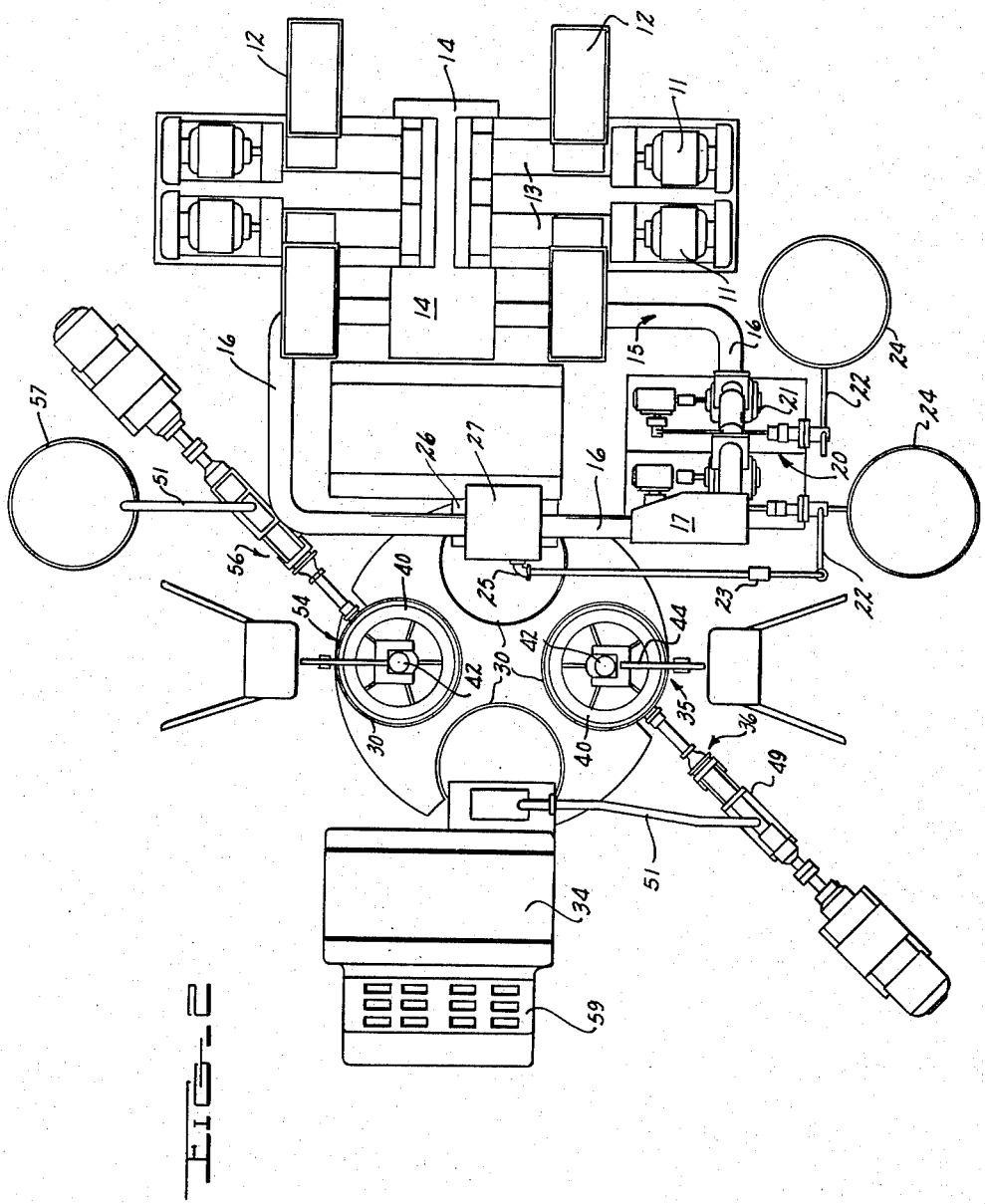

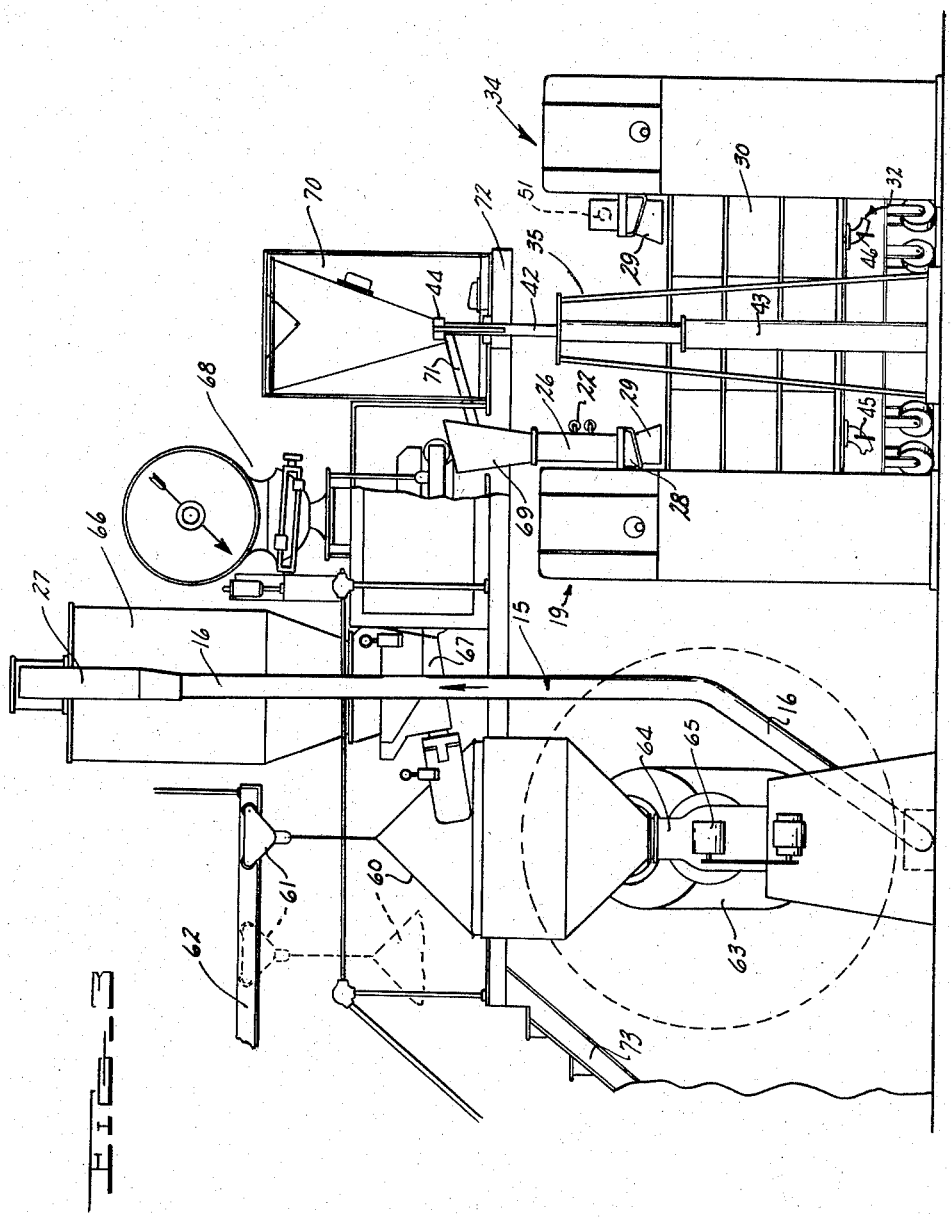

2,874,907

METHOD AND APPARATUS FOR FORMULATING MATERIALS

Harold J. Renaud, Okemus, Mich., and George M. Kovac, Lincolnwood, Ill., assignors to Ren Plastics, Inc., Lansing, Mich., a corporation of Michigan Application January 30, 1956, Serial No. 562,120

9 Claims. (Cl. 241—21)

The present invention relates to an improved method for accurately formulating proportionately, mixing, and blending relatively dry and wet materials in a substantially continuous fashion to produce various industrial and commercial end compounds, and to an apparatus or system for carrying out the method. As specially devised, and as herein illustrated and described, the method and apparatus are adapted to the production of a plastic resin or like chemical molding compound, such as an epoxy resin composition having many industrial uses.

However, it is to be understood that the principles of the invention are by no means restricted in their application to this field. On the contrary, the invention has great practical utility in the production of paints, various other types of coatings, food products, lubricants, etc. It will pertain to the preparation of any mixture, slurry, emulsion or colloidal suspension employed for such purposes and calling for a highly uniform and intimate mixing, particle size reduction and blending of relatively dry and wet ingredients, as well as for a very accurate initial proportioning of the ingredients, gravimetrically or volumetrically.

The invention also affords a method and apparatus for these operations which are readily and widely controllable or versatile as to desired adjustments and operating conditions, as well as reliable and of high productive capacity. Thus, the method and apparatus are perfectly suited to the preparation of compounds which are either thixotropic or dilatant in their response to agitation. It will readily be perceived that the wide and exacting demands successfully met by the method and apparatus in this and other respects transcend those ordinarily coped with by conventional proportioning, comminuting and compounding equipment.

Other than in respect to shortcomings in the above mentioned factors of versatility, accuracy, continuity and reliability of operation, one of the practical drawbacks in existing machinery for mixing dry and wet ingredients, especially those which must be kept in constant proportion, is the impossibility of keeping the equipment clean as the mix is handled, or as successive batches are periodically charged thereto. For example, although conventional agitator-type mixing and blending drums or containers are ordinarily kept acceptably clean by the scraper action of their agitator, no successful means or procedure has heretofore been devised to scrape the agitator means itself, other than by closing down the equipment for this purpose. It is evident that unless the cleaning is thoroughly performed, residual amounts of the mixed material on the agitator will throw out of balance the desired proportions of ingredients at some phase. In view of the fact that a small percentage unbalancing of proportions of some ingredients, such as catalytic agents, may greatly affect the characteristic of the compound prepared, continuously or by batch, it is seen that the need for efficient cleaning is imperative.

It is, of course, a general object of the invention to provide a continuous method for accurately proportioning, comminuting and blending materials of the sort referred to, and an improved and widely adaptable apparatus for putting the method in practice. However, a more specific object is to provide such a method and apparatus in which provisions are put into effect, during a stage in which the mixture is being transferred for a succeeding operation, to clean and discharge a residual accumulation thereof such as might unbalance the proportions of ingredients of a successive charge or increment of a charge to reach that point. In the illustrated embodiment of the apparatus this purging operation is performed by a ram or plunger unit, which may also serve in supplementation of the action of a pump in the transfer of a particularly viscous formulation to the succeeding operation.

Generally, it is an object of the invention to provide a method of formulating materials in which relatively dry and wet ingredients are mixed, comminuted and spray-blended incrementally, as distinguished from a bulk or batch processing thereof. In this sense the method can be said to be an inherently continuous one, for as performed by a preferred type of apparatus (hereinafter described) each relatively minute increment of the mass of material treated in the procedure reflects accurately in miniature ratio the uniform proportioning and blending of the ingredients which is desired at the ultimate output of the equipment. As the dry ingredients are brought together and forwarded toward a blending station their proportionate composition in reference to one another is, in any incremental portion selected at random, the same as it is in any other incremental portion at any other phase prior to or after the blending station; and the same is true of the wet materials as they also are handled throughout the procedure.

As indicated above, another object is to provide a method and apparatus of the described type, in which all operations and units performing the operations are highly controllable in respect to the functions they perform, whether that of proportioning ingredients, reducing the ingredients in particle size, admixing differing proportions of the respectively proportioned dry and wet ingredients, etc.

These objectives are attained in the operation of equipment which, briefly, comprises a unit or station at which any desired number of dry ingredients are accurately proportioned and fed continuously, as by an enclosed flight type or screw conveyor, to a comminuting unit at which they are mixed, pulverized and initially blended with further, accurately proportioned wet ingredients; and these are continuously fed to the comminutor from a liquid supply and metering station. The wet and dry ingredients very uniformly and intimately mixed or blended under and air-flotation, hammer mill action at the comminutor, are then transferred, as a blended composition, in a novel fashion for further treatment, which may be of the nature of a succeeding finish blending, as may be required for a viscous mix, or may be by way of disposal for packaging or the like. In either case the transfer phase, the only phase at which the material is in other than a continuously moving state, involves the use of means which keeps the equipment clean and free from accumulated material. This equipment also has a special function in the forwarding of relatively viscous compounds, of down to zero flow consistency.

In regard to the novel transfer phase referred to above, the equipment is such that, depending upon the relative viscosity of the composition to be transferred, it may be forwarded during the transfer phase either gravitationally or under positive force to the next station or unit which handles it. Although the flow of material may come to a halt, the transfer operation actually does not negate the desired feature of continuity of handling of the ingredients from the initial stage of the operation, in that the materials are being prepared for forwarding as other ingredient materials are being proportioned, treated and forwarded to the transfer stage.

Other objects and advantages of the invention will become apparent as the description proceeds, especially when taken in conjunction with the accompanying drawings, wherein:

Fig. 1 is an elevational view showing the general character of the various units of the equipment, in one arrangement thereof;

Fig. 2 is a top plan view of the apparatus of Fig. 1; and

Fig. 3 is a fragmentary elevational view of a preferred embodiment of apparatus for performing the improved method.

Referring first to Figs. 1 and 2 of the drawings, the reference numeral 10 generally designates a proportioning feeder unit or station measuring and dispensing dry ingredients of a compound to be formulated. This will be assumed to be an epoxy resin, plastic molding compound or the like, including any necessary filler material, solvent, color, etc. The unit 10 consists of one or more motor-driven proportioning feeder units 11 (four being shown) each continuously supplied by a gravity hopper 12 and having a discharge through a lateral outlet feeder or conveyor device 13 to a common, continuously acting, vibrator-type forwarding trough device 14 located at the adjacent inner discharge ends of the feeders 13.

As in other component stations or units of the system, the particular nature of the feeder units 10 is not controlling in the invention, and the specific structural details thereof have not been illustrated. It suffices to state that they are of a type capable of accurately measuring and dispensing a wide variety of dry materials, powdery, granular, diced, etc., and are settable readily to vary the amount or rate of dispensation. Any desired number of the units 10 will be employed to handle the respective ingredients to enter into a desired formulation. Proportioning feeders of this general type are available to the trade; and their selection should be based on the capacity of the unit to produce continuous, accurate and reliable proportioning of dry ingredients in the manner described, which materials may vary considerably in respect to their physical characteristics. As stated, the units 10 should incorporate provisions (not shown) for adjustably controlling their output, so that accurate control may be had as to the ratios of ingredients as continuously discharged by the several units 10.

The thus proportioned dry ingredients are forwarded by the trough 14 to the left as viewed in Figs. 1 and 2, where they are gravitationally discharged into a continuous enclosed conveyor 15. This may be a Hapman tubular type, comprising a multiplicity of longitudinally spaced, flexibility articulated conveyor disks or flights (not shown) traveling in a continuous housing tube 16, the direction of travel being indicated by the arrows in Figs. 1 and 2. A conveyor of this sort is driven by a meshing sprocket (not shown) encased in a housing 17 at an upper corner of the looped outline of the conveyor 15, this arrangement being a conventional and well known one, typical of the mentioned type of conveyor.

Alternatively, a continuously acting screw type conveyor of appropriate design may be substituted for that referred to. However, in either type the conveyor spaces between successive forwarding elements of the conveyor, whether articulated disks or successive screw formations, will be filled with a well and accurately proportioned dry mix.

The continuous conveyor 15 is best illustrated in Fig. 1 as conveying the material laterally and upwardly from the discharge through 14 of the proportioning feeder units 10, then horizontally and then downwardly and laterally to the feed device 14. The conveyor discharges at an elevated intermediate point to an initial mixing, comminuting and blending station or unit 19.

The comminutor unit 19 is preferably a hammer mill type, such as a so-called Fitz Mill, Model D—Series 1600, manufactured by W. J. Fitzpatrick Company of Chicago, Illinois. Such units of different manufacture are available on the market and will perform the desired continuous spray blending action on dry and liquid materials charged thereto. As indicated above, it is intended that the unit 19 shall effect a thorough, variably controllable particle size reduction and blending on an incremental basis. It should have, therefore, suitable provision to adjust the same as to rotor speed, blade shape and spacing, screen size, angle of entry of materials, etc., in order to have the versatility contemplated by the invention.

The reference numeral 20 generally designates a unit supplying one or more liquid ingredients. The unit 10 incorporates motor driven proportioning and pumping devices 21 of known type, plus controls therefor (not shown) which are capable of accurately supplying and feeding closely proportioned ratios of the respective liquid ingredients for admixture and blending with the dry at the unit 19, to which the output of the liquid handling unit 20 is pumped through piping 22. This piping is schematically shown in the drawings as comprising a single reach or length acting as a common manifold, which may be equipped with a totalizer meter 23 to indicate the rate of flow of the liquid. The liquid pumping and proportioning devices 21 are, of course, each provided with its individual supply tank 24, and it is contemplated that there may also be individual parallel feed lines of metered piping 22 to the comminutor unit 19.

The piping 22 discharges at 25 to the intake housing 26 of the unit 19, which intake is also supplied with dry material from conveyor 15 through an upper hopper extension 27. Proportioned quantities of liquid and dry materials as thus received by the intake member 26 pass through an inlet housing member 28 to the comminutor proper 19. They are subjected in the unit 19 to uniform and thorough incremental mixing, particle size reduction, wetting and blending, as referred to above, to reduce the same to a plastic or fluid condition.

Incidentally, the term "plastic" and others deriving therefrom are used in their broad sense in the specification and claims to follow, unless specially qualified otherwise, to signify a material of moldable or more or less flowable consistency, or the character of such a material.

As thus blended by the unit 19 the mass of plastic compound is continuously discharged, as through a throat 29, into one of a number of upright cylindrical receiving tanks or drums 30. These are supported in uniformly spaced angular relation to one another on an indexing turntable, which is generally designated 32.

Here it should be pointed out that as so discharged the blended compound may vary widely in viscosity, i. e. from a relatively liquid, free flowing state to a putty-like consistency, actually self-sustaining or of a zero flow characteristic. It has been found, for example that some epoxy resin molding compounds, instanced as suitable for formulation by the present method and apparatus, have viscosities of a degree such they can neither be handled gravitationally, nor even subjected to convergent flow freely. In fact it is for this reason that the discharge throat 29 of the comminutor unit 19 is preferably a divergent walled one in any installation required to handle a range of compounding operations.

It is for this reason that, although it is often desirable, in the case of viscous compounds, to subject the composition to successive stages of comminution and blending, the stages may not be compounded vertically for gravitational transfer from one to the other; this may be entirely satisfactory and practical in the preparation of a compound of low or negligible viscosity, yet may be impractical to the extent of being inoperative in the case of a compound of an intermediate or substantially greater viscosity.

By the same token, it has been found that a high viscosity mix cannot in many cases be successfully transferred from a tank, drum or container 30 initially receiving the same simply by pumping from a discharge connection of the container, for the material so withdrawn will exit only in a local zone, leaving a doughnut-like or torus cross sectioned, large unwithdrawn mass in the container.

Accordingly, in view of these difficulties and in accordance with the invention, the material as received by container drum 30 from the comminutor discharge throat 29 is forwarded from that drum to a subsequent finish comminuting, mixing and blending station or unit, generally designated 34, in a closed path and under a combined positive ram and suction pumping action, performed at an intermediate drum emptying and purging station or unit 35. A positive displacement pump unit associated with unit 35 is numbered 36.

The containers 30 (of which there are four illustrated in the drawing) are periodically indexed from a receiving position at discharge throat 29 to the ram-pump unit 35 on the indexing table 32. Table 32 is periodically driven rotatably, in appropriately timed relation to the filling of each drum 30, by means of a suitable indexing drive device. This device may comprise, for example, a timed electric motor (not shown) driving the table through a bevel gear arrangement (not shown). Other optional drive provisions will suggest themselves.

As herein illustrated, the ram unit 35 comprises a vertically acting plunger 40 of diameter equalling the internal diameter of the container 30 and positioned coaxially of and above the latter when the indexing turntable 32 comes to rest. Suitable packing material 41 may be applied to the plunger 40 to engage and seal against the cylindrical side wall of the container 30 as the plunger is forced therein to expel the mass of compounded material downwardly. As an operating mechanism for the ram plunger, it may be operatively connected to an actuator vertical rod 42 which is driven on properly timed upward and downward strokes by a piston in a braced pneumatic cylinder 43, an appropriate yoke 44 connecting plunger 40 with the top of actuator rod 42. The plunger power arrangement may, of course, be modified if desired, since the particular provisions are not critical or especially germane to the invention.

Plunger 40 thoroughly cleans the inner wall of the drum or container 30 as it forces a relatively viscous mass of material downwardly under positive ram action to a drum discharge fitting 45, which connects upwardly with the bottom of each container 30. Suitable releasable coupling and manual valving means, generally designated by the reference numeral 46, is provided to enable the discharge fitting 45 to be successively connected with the intake conduit or fitting 47 of the pump unit 36. The ram expelled mass is pumped by the latter to a further station.

It will be recognized that, since the improved method and apparatus must be capable of handling viscosities ranging from maximum to zero fluidity, incapable of gravity feed, the intermittent transfer at station 32, with positive ram-pump means and valving available to control the flow of material through a closed path, is of considerable importance in the invention. This is true regardless of the nature of the operating station to which pump unit 36 discharges. Although it is indeed desirable in many instances that successive comminuting phase operations be performed on the material, requiring duplicated units 19 as to which transfer steps are required, and thus in turn indicating the desirability of a rotative indexing, the transfer is not necessarily intended to be limited to a rotative turntable action. In certain simplified installations a simple shuttling of drums from a drum intake station to a drum emptying station, and return, involving a linear movement, will suffice. The important thing is that continuity of drum filling and of drum emptying and purging is preserved in either type installation.

Furthermore, although a rotatably indexed turntable or shuttle will seem usually to involve the use of some sort of releasable valve coupling 46 for manually coupling and decoupling the drum and pump as the former is indexed to and away from pump unit 36, provisions may also be made to obviate the need for such manual intervention. An arrangement for this purpose is illustrated and described in the copending application of George M. Kovac, Serial No. 562,124, filed January 30, 1956.

The pumping unit 36 includes a positive displacement pump 49, which may be a Moyno progressing cavity screw type driven by a motor and variable speed power transmission arrangement 50; and in accordance with the invention the intake and discharge ends of this type of pump are reversed, in reference to their normal hook-up. A Model 1L4 pump as marketed by Robbins and Meyers Corp.—Moyno Pump Division, of Springfield, Ohio, is suitable for the purpose. The normal pump discharge member constituting the intake conduit 47 of unit 36 is thus communicated by releasable coupling 46 with the drum discharge fitting 45. The material which is ram forced to pump unit 36 through fitting 45 is discharged upwardly through its intake, converted to a discharge, through a line 51 to the intake housing 52 of the finishing comminutor unit 34. It will be appreciated that in forcing the material ahead, the screw-type pump 49 has a further mixing and blending action on the wet mass. Unit 34 is identical in its general characteristics to the initial comminutor 19, and similar to the unit 19 in all particular respects, save possibly in the adjustment of its parts. These matters are determined, of course, by the condition of the mix as received and the condition desired upon discharge.

As the container 30 is again filled from the discharge throat 29 of finish comminutor unit 34, turntable 32 indexes the same to a final discharge station, incorporating a pneumatic ram device 54 and pumping unit 56 which are identical to the respective units 35, 36 and are operatively mounted and connected to function similarly. Hence further description in detail of the station 54, 56 will be dispensed with. It need only be pointed out that the discharge line 51 of the pump 49 of the unit 56 leads to a further, track mounted receiving container or tank 57. From this the finally compounded material may be withdrawn for packaging by any suitable automatic equipment.

The number of comminuting and blending units 19, 34 may be increased in the treatment of exceedingly heavy mixes, for example, or lessened, and a corresponding change in the number of other units servicing the same will be either necessary or optional.

The reference numeral 59 designates an indicating and control panel which may be directly or remotely associated with the apparatus, at which the operation of the apparatus is controlled, for example, in regard to starting, timing or phasing of operations at the proportioning feeders, comminutors, pumps, turntable and the like, and stopping of the apparatus. Structural features of this panel, as well as the necessary wiring of the apparatus and incidental or auxiliary equipment associated therewith, constitute no part of the invention and are therefore not further illustrated or described.

The alternative embodiment of the invention illustrated in Fig. 3 of the drawings represents a commercial installation in which certain of the steps of the method and the arrangement of parts of the apparatus are modified somewhat, although the advantages of continuity of action, accuracy, and especially flexibility or versatility in respect to the preparation of widely different compounds are the same. Moreover, the installation of Fig.

3 accomplishes a desired incremental mixing and blending of the dry ingredients, as referred to above, in this phase of their advance to the comminutor and blendor 19, in which their spray blending with a liquid component or components occurs. Structural units in the form of Fig. 3 which correspond with units appearing in Figs. 1 and 2 are designated by corresponding reference numerals, and further description thereof is omitted.

The liquid ingredients to be compounded are pump-fed by provisions similar to those of Figs. 1 and 2 to the intake housing 26 of the first comminuting unit 19, as through the piping 22. The dry ingredients are suitably proportioned and weighed at a station (not shown), and are charged to a traveling hopper 60 which is flexibly suspended from a guide roller member 61 traveling horizontally in an overhead track 62. The hopper 60 is shown in solid lines in an operative position at which it discharges to a standard type of rotary blender 63, and is indicated in dotted lines as it travels between the proportioning and measuring station and the solid line position. A Model P–K twin shell dry blender in accordance with the patent to Fischer et al., No. 2,514,126 of July 4, 1950, manufactured by Patterson-Kelley Co., Inc., of East Stroudsburg, Pa., is suitable. The initially blended dry materials are gravitationally unloaded from hopper 60 into the intake throat 64 of the blender 63 which, upon receiving the charge, is rotated in a vertical plane above a trunnion structure whose axis aligns with a motor driven gear reduction unit 65. The blender 63 is thus rotated in an arc indicated in dotted line in Fig. 3.

As mechanically mixed in the unit 63, the material is incrementally blended in the sense referred to above, it is then discharged from unit 63 and is fed upwardly by the continuous, endless conveyor 15 to a receiver 66 of considerable capacity, from which it discharges to a feed-in device 67 of a belt-type gravimetric metering unit 68. The unit 68 in turn discharges to an intake hopper 69 leading to the housing 26 of the comminutor unit 19.

If desired, an auxiliary solids additive unit 70 may be employed, which is controlled automatically by structure such as is designated 71 to operate in timed relation to the operation of the remainder of the apparatus. The unit 70 is positioned, as are the receiver 66 and gravimetric metering unit 68, on an elevated platform 72, to which access is had by a flight of stairs 73 from the measuring and weighing station (not shown) on the lower level.

For the rest, the initial and finish comminuting units 19, the turntable 32, the ram unit 35, as well as associated pumping units, are the same as illustrated in Figs. 1 and 2, both structurally and operationally, and it has not been deemed necessary to specially illustrate such provisions. To the extent that they are shown, corresponding reference numerals are employed.

In the operation of the improved method by the apparatus of Fig. 3 (or equivalent apparatus), dry and liquid materials are carefully and accurately proportioned as to weight or volume, whether by the unit 10 of Figs. 1 and 2 or by equivalent structure or equivalent procedure; they are incrementally blended in being forwarded to an initial comminuting, mixing and blending unit 19, which furthers the incremental and inherently continuous blending of the composition; they are discharged to a drum or container from the comminuting unit, are removed in this container from the receiving point as another similar container approaches it; are, in the case of a heavy, viscous mix, removed from the container while the latter is cleaned or purged by coacting positive ram and suction pump units 35, 36; and following this expulsion and transfer, the mix arrives at a succeeding station, at the finish comminuting unit 34, where the operation of unit 19 is repeated.

It is evident that the invention affords a method and apparatus of great versatility in respect to the range of compounds capable of being formulated thereby. The term "zero flow consistency" has been employed to describe one limit of this range, i. e. represented by a thixotropic composition which can be moved through an orifice when subjected to shearing forces great enough to produce motion but which exhibits no flow and is self-sustaining when not subject to such shearing forces. At the other limit is a liquid condition lacking self-sustainability.

Obviously, the equipment illustrated may require adjustment as to its composition and the operations performed thereby in handling such a range of consistencies. Typical successful installations have been illustrated, and it will be appreciated that they may be altered considerable in regard to the positional relationships of their component parts, as in taking advantage of gravity in the feed of flowable materials, liquid or dry. In these respects, the invention should be construed with no more limitation than is imposed by the appended claims.

What we claim as our invention is:

1. Apparatus for continuously and accurately formulating relatively dry and wet ingredients, comprising means for accurately proportioning dry ingredients and continuously forwarding the same in a proportioned admixture, means for continuously proportioning and forwarding wet ingredients, means for comminuting said dry ingredients and blending the same with said relatively wet ingredients to produce an incrementally blended, flowable composition of viscosity as determined by the nature and proportions of said relatively dry and wet materials, a unit container to which said composition is discharged from said comminuting means, means for successively shifting said container to and from receiving relation to said comminuting means, and container emptying means to which the container is moved by said shifting means.

2. Apparatus for continuously and accurately formulating compounds incorporating relatively dry and wet ingredients, comprising means for accurately proportioning dry ingredients and continuously forwarding the same in a proportioned admixture, means for continuously proportioning and forwarding wet ingredients, means for comminuting said dry ingredients, and blending the same with said relatively wet ingredients to produce an incrementally blended, flowable composition of viscosity as determined by the nature and proportions of said relatively dry and wet materials, a unit container to which said composition is discharged from said comminuting means, means for successively shifting said container to and from receiving relation to said comminuting means by intermittent rotative indexing movement, and container emptying means to which the container is moved by said shifting means.

3. Apparatus for continuously and accurately formulating compounds incorporating relatively dry and wet ingredients, comprising means for accurately proportioning dry ingredients and continuously forwarding the same in a proportioned admixture, means for continuously proportioning and forwarding wet ingredients, means for comminuting said dry ingredients and blending the same with said relatively wet ingredients to produce an incrementally blended, flowable composition of viscosity as determined by the nature and proportions of said relatively dry and wet materials, a unit container to which said composition is discharged from said comminuting means, means for successively shifting said container to and from receiving relation to said comminuting means by intermittent rotative indexing movement, and container emptying means to which the container is moved by said shifting means, said emptying means comprising combined positively acting ram and suction pumping devices operatively connected to said container on opposite ends of the contents thereof.

4. Apparatus for continuously and accurately formulating compounds incorporating relatively dry and wet ingredients, comprising means for accurately proportioning dry ingredients and continuously forwarding the same in a proportioned admixture, means for continuously proportioning and forwarding wet ingredients, means for comminuting said dry ingredients and blending the same with said relatively wet ingredients to produce an incrementally blended, flowable composition of viscosity as determined by the nature and proportions of said relatively dry and wet materials, a unit container to which said composition is discharged from said comminuting means, means for successively shifting said container to and from receiving relation to said comminuting means, and container emptying means to which the container is moved by said shifting means, said emptying means comprising combined positively acting ram and suction pumping devices operatively connected to sad container on opposite ends of the contents thereof, said ram device having wiping engagement with the interior of said container to clean the latter.

5. Apparatus for the formulation of dry and wet ingredients to constitute a plastic or flowable compound, comprising a plurality of proportioning feeders for dry ingredients, a common discharge unit receiving the proportioned ingredients, a continuously moving conveyor in receiving relation to said discharge unit, a comminuting and blending unit to which said dry ingredients are forwarded by said conveyor, means for proportioning and feeding liquid ingredients to said comminuting and blending unit for treatment along with said dry ingredients, a transfer unit having containers periodically shiftable to and from receiving relation to said comminuting and blending unit, means for emptying said containers, to which means the latter are shifted by said periodically acting shifting means.

6. Apparatus for the formulation of dry and wet ingredients to constitute a plastic or flowable compound, comprising a plurality of proportioning feeders for dry ingredients, a common discharge unit receiving the proportioned ingredients, a continuously moving conveyor in receiving relation to said discharge unit, a comminuting and blending unit to which said dry ingredients are forwarded by said conveyor, means for proportioning and feeding liquid ingredients to said comminuting and blending unit for treatment along with said dry ingredients, a transfer unit having containers periodically shiftable to and from receiving relation to said comminuting and blending unit, means for emptying said containers, to which means the latter are shifted by said periodically acting shifting means, comprising a ram device proportioned to have cleaning engagement with the interior of said containers in traveling through the latter.

7. Apparatus for the formulation of dry and wet ingredients to constitute a plastic or flowable compound, comprising a plurality of proportioning feeders for dry ingredients, a common discharge unit receiving the proportioned ingredients, a continuously moving conveyor in receiving relation to said discharge unit, a comminuting and blending unit to which said dry ingredients are forwarded by said conveyor, means for proportioning and feeding liquid ingredients to said comminuting and blending unit for treatment along with said dry ingredients, a transfer unit having containers periodically shiftable to and from receiving relation and to said comminuting and blending unit, means for emptying said containers, to which means the latter are shifted by said periodically acting shifting means, comprising a ram device proportioned to have cleaning engagement with the interior of said containers in traveling through the latter, and a pump having its intake in receiving relation to material forced through the containers by said ram device.

8. Apparatus for the formulation of dry and wet ingredients to constitute a plastic or flowable compound, comprising a plurality of proportioning feeders for dry ingredients, a common discharge unit receiving the proportioned ingredients, a continuously moving conveyor in receiving relation to said discharge unit, a comminuting and blending unit to which said dry ingredients are forwarded by said conveyor, means for proportioning and feeding liquid ingredients to said comminuting and blending unit for treatment along with said dry ingredients, a transfer unit having containers periodically shiftable to and from receiving relation to said comminuting and blending unit, means for emptying said containers, to which means the latter are shifted by said periodically acting shifting means, comprising a ram device proportioned to have cleaning engagement with the interior of said containers in traveling through the latter, and a pump having its intake in receiving relation to material forced through the containers by said ram device, and a further comminuting and blending unit connected in receiving relation to the discharge of said container emptying means.

9. A method of formulating dry and liquid materials to provide a blended wet mass of uniformly distributed granular structure, comprising the steps of forwarding a plurality of dry ingredients toward a blending station and proportionately mixing said dry ingredients before their arrival at said station to an extent to provide an incrementally admixed dry mass, discharging said ingredients at said blending station upon arrival, blending said ingredients at said station and reducing the particle size thereof, while mixing therewith at least one liquid ingredient to produce an incrementally blended wet mass, forwarding said wet mass in a closed path and under substantial pressure to a further blending station, and continuing the mixing and blending of said wet mass at said further station.

References Cited in the file of this patent

UNITED STATES PATENTS

| | | |
|---|---|---|
| 1,228,640 | Belton | June 5, 1917 |
| 1,920,025 | Thordsen | July 25, 1933 |
| 2,105,759 | Stevenson | Jan. 18, 1938 |
| 2,285,765 | Carswell | June 8, 1942 |